United States Patent [19]

Ashizawa et al.

[11] Patent Number: 4,894,294
[45] Date of Patent: Jan. 16, 1990

[54] ELECTROLYTIC SOLUTION SUPPLY TYPE BATTERY

[75] Inventors: Koichi Ashizawa, Tokyo; Hideharu Ogino, Matsudo; Shunji Shimizu, Tokyo, all of Japan

[73] Assignee: The Furukawa Electric Co., Ltd., Tokyo, Japan

[21] Appl. No.: 739,557

[22] Filed: May 30, 1985

[30] Foreign Application Priority Data

Jun. 5, 1984 [JP] Japan .................................. 59-114738
Apr. 11, 1985 [JP] Japan ............................. 60-54198[U]

[51] Int. Cl.⁴ .................................................. H01M 8/24
[52] U.S. Cl. ........................................ 429/18; 429/27; 429/34
[58] Field of Search ............................. 429/18, 27, 34

[56] References Cited

U.S. PATENT DOCUMENTS

| | | |
|---|---|---|
| 2,673,232 | 3/1954 | Silsby, Jr. . |
| 3,161,546 | 12/1964 | Yeager et al. . |
| 3,811,945 | 5/1974 | DeRossi . |
| 4,204,032 | 5/1980 | McKellen .......................... 429/27 X |
| 4,371,433 | 2/1983 | Salko et al. ........................ 429/18 X |
| 4,371,825 | 2/1983 | Chi et al. . |
| 4,377,445 | 3/1983 | Grimes ............................... 429/18 X |
| 4,416,953 | 11/1983 | Hashimoto et al. ................... 429/18 |
| 4,518,663 | 5/1985 | Kodali et al. . |

FOREIGN PATENT DOCUMENTS

| | | |
|---|---|---|
| 92911 | 11/1983 | European Pat. Off. . |
| 2131394 | 11/1973 | Fed. Rep. of Germany . |
| 1528393 | 4/1968 | France . |
| 2142763 | 2/1973 | France . |
| 2493610 | 5/1982 | France . |
| 57-118380 | 7/1982 | Japan . |
| 206961 | 9/1939 | Switzerland . |
| 452782 | 9/1936 | United Kingdom . |
| 943572 | 12/1963 | United Kingdom . |
| 1249308 | 10/1971 | United Kingdom . |
| 1350725 | 4/1974 | United Kingdom . |

OTHER PUBLICATIONS

Copy of Official Action issued in the German Patent Office dated Aug. 25, 1986, and an English translation of same.
Derwent Japanese Patents Report, vol. T, No. 30, 29 aout 1972, resume 48747T;and JP-A- 72 27 690 (Japan Storage Battery Co.) 24-07-1972.

Primary Examiner—Stephen J. Kalafut
Attorney, Agent, or Firm—Frishauf, Holtz, Goodman & Woodward

[57] ABSTRACT

In an electrolytic solution supply type battery of an arrangement wherein an electrolytic solution is distributed and supplied to each of a plurality of electrically series-connected or stacked unit cells from a common supply path through distribution liquid paths, respectively, and the electrolytic solution is exhausted from each of the plurality of unit cells and collected in a common exhaust path through exhaust liquid paths, respectively, each distribution liquid path at an electrolytic solution supply side and/or each exhaust liquid path has midway therealong a liquid flow interrupt portion utilizing natural fall of the electrolytic solution. At the portion, the electrolytic solution is rendered discontinuous during falling and is formed into droplets, thereby preventing liquid short-circuit between each two adjacent unit cells.

3 Claims, 4 Drawing Sheets

ELECTROLYTIC SOLUTION SUPPLY TYPE BATTERY

BACKGROUND OF THE INVENTION

1. Field of the Invention

The present invention relates to an electrolytic solution supply type battery in which a plurality of unit cells are electrically series-connected or stacked and, more particularly, to a battery of this type wherein liquid short-circuit among unit cells is prevented.

So-called electrolytic solution supply type batteries wherein an electrolytic solution is externally supplied and is exhausted outside the cells through an electrode reaction section within each cell include several types such as zinc-halogen batteries, redox cells and fuel cells. In order to increase the capacity of such a battery, a number of unit cells must be connected in series or parallel Since series connection allows adoption of a bipolar electrode structure, it is very advantageous for increasing the capacity of a battery.

2. Description of the Prior Art

When unit cells are series-connected or stacked in such an electrolytic solution supply type battery, the circulation method is generally adopted. In this method, an electrolytic solution is generally supplied from a common electrolytic solution tank, and the electrolytic solution exhausted from each unit cell is recovered in the electrolytic solution tank. FIG. 3 shows an example of such a battery. Referring to FIG. 3, four unit cells C-1, C-2, C-3 and C-4 are series-connected. An electrolytic solution 3 is respectively supplied from an electrolytic solution tank T to the unit cells C-1, C-2, C-3 and C-4 by a pump P through a common supply path 1' and respective distribution liquid paths 2'a, 2'b, 2'c and 2'd. The electrolytic solution exhausted from the respective unit cells is returned to the tank T through respective exhaust liquid paths 4'a, 4'b, 4'c and 4'd and a common exhaust path 5'. However, when the battery of this arrangement is operated, as shown in FIG. 4, in addition to a current I of the battery, a liquid short-circuit current (shunt current) I' flows among the cells through the electrolytic solution in the distribution and exhaust liquid paths. This causes a liquid short-circuit and results in a large current loss. When this state is represented by an electric equivalent circuit, it is as shown in FIG. 5. Referring to FIG. 5, reference symbols R1 to R4 represent resistors.

When such a liquid short-circuit occurs, the discharge capacity is decreased in the case of a primary battery. In the case of a secondary battery, both the charge and discharge capacities are decreased and charge and discharge efficiencies are considerably decreased. In order to prevent such a liquid short-circuit and its adverse influence, the resistances of the electrolytic solution portions in the liquid path between each two adjacent unit cells, i.e., R1 to R4 in FIG. 5 are increased. More specifically, the lengths of the liquid paths between each two adjacent unit cells (e.g., l1, l2, W1 and W2 in FIG. 4) are increased or the cross-sectional areas of the liquid paths (e.g. S1 to S4 in FIG. 4) are decreased in accordance with the equation $R = \rho \cdot l/S$ (where R: resistance, $\rho$: resistivity; l: length of liquid path; S: cross-sectional area). In accordance with another method, a rotating member is arranged in a liquid path to cut off the electrolytic solution and to interrupt the continuity of the electrolytic solution.

However, when the liquid path length between each two adjacent cells is increased, the piping is increased. This renders the battery structure complex and increases the battery volume. Furthermore, when the cross-sectional area of the liquid path is decreased, the resistance of the electrolytic solution is increased, and pressure loss is increased. In either case, specific problems are encountered and liquid short-circuit cannot be completely prevented. With the method in which the electrolytic solution is cut off by using a rotating member, the piping is rendered complex, and mechanical durability of the rotating member presents a problem, resulting in an unsatisfactory resolution of the problem.

SUMMARY OF THE INVENTION

The present invention has been made in consideration of the above problems and has as its object to provide an electrolytic solution supply type battery wherein a plurality of unit cells are electrically series-connected or stacked, an electrolytic solution is supplied from a common supply path to the unit cells through respective distribution liquid paths, and the electrolytic solution is collected in a common exhaust path from the unit cells and is exhausted through exhaust liquid paths, wherein a liquid flow interrupt portion of the electrolytic solution utilizing natural fall of the electrolytic solution is arranged along each distribution liquid path at the electrolytic solution supply side and/or each exhaust liquid path at the electrolytic solution exhaust side, thereby preventing a liquid short-circuit between each two adjacent unit cells.

If a liquid collection chamber for allowing natural fall of the solution is arranged in each distribution liquid path and each exhaust liquid path, and the solution collected in such a chamber is equally distributed and allowed to fall into a plurality of exhaust ports, the distance of liquid discontinuity by natural fall can be shortened.

DETAILED DESCRIPTION OF THE PREFERRED EMBODIMENT

Figure 1:
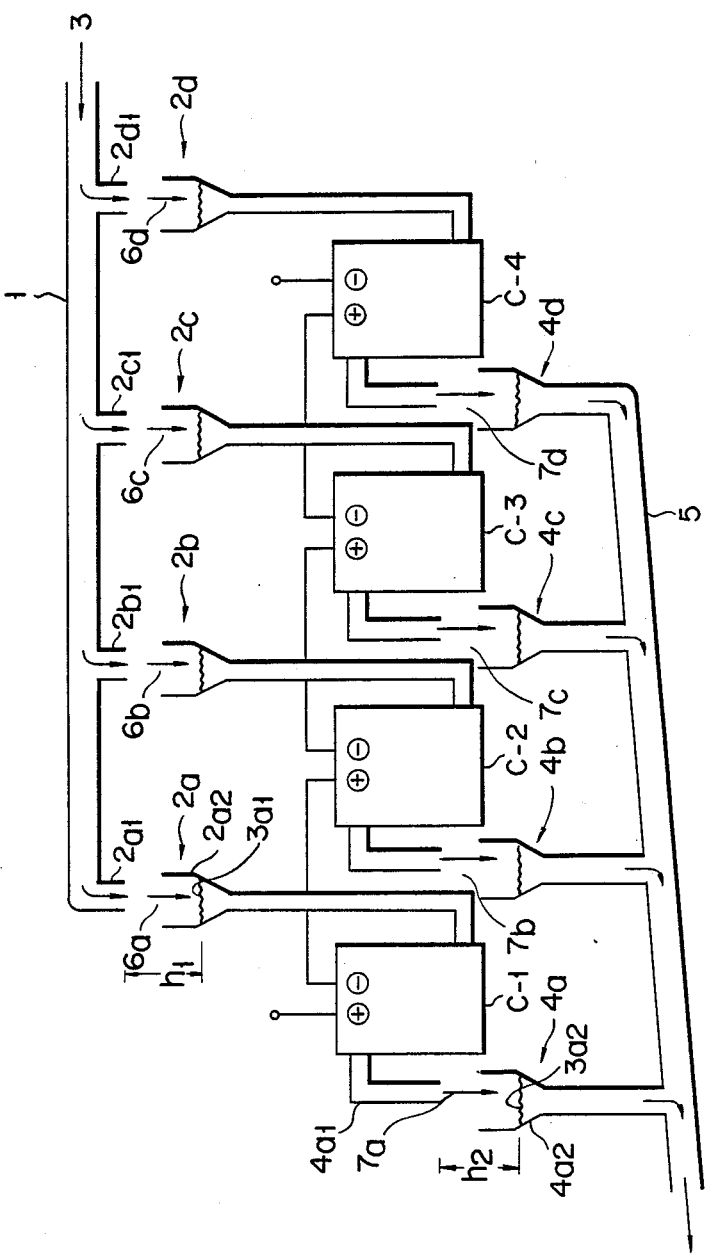
FIG. 1 is a diagram showing an electrolytic solution supply type battery according to an embodiment of the present invention.

FIG. 1 shows an electrolytic solution supply battery according to an embodiment of the present invention. Referring to FIG. 1, an electrolytic solution 3 is distributed and supplied to a plurality of (four in the illustrated embodiment) unit cells C-1, C-2, C-3 and C-4 through respective distribution liquid paths 2a, 2b, 2c and 2d branching from a common supply path 1. The electrolytic solution passing through the electrode reaction sections in the respective unit cells is collected in a common exhaust path 5 through respective exhaust liquid paths 4a, 4b, 4c and 4d and is exhausted. In the battery of this arrangement, liquid flow interrupt portions 6a, 6b, 6c and 6d by natural fall of the electrolytic solution are formed midway along the distribution liquid paths 2a, 2b, 2c and 2d at the electrolytic solution supply side. Similarly, liquid flow interrupt portions 7a, 7b, 7c and 7d are formed midway along the exhaust liquid paths 4a, 4b, 4c and 4d, thereby preventing liquid short-circuit between each two adjacent unit cells.

Each liquid flow interrupt portion is obtained by vertically separating a portion of each distribution or exhaust liquid path in accordance with a predetermined natural fall distance h required for discontinuity of the electrolytic solution. The upper end of the lower pipe has an enlarged diameter so as to receive falling electrolytic solution.

The natural fall distance h required for discontinuity of the electrolytic solution can be explained as follows with reference to the portion 6a of the distribution liquid path 2a. The distance h in this case is a distance h1 between a liquid fall port of an upper pipe 2a1 and an electrolytic solution level 3a1 of a lower pipe 2a2, through which distance the electrolytic solution 3 naturally falls in a physically discontinuous state, i.e., in the form of droplets and reaches the level 3a1. This also applies to the exhaust liquid paths. For example, the liquid flow interrupt portion 7a is arranged in accordance with a required natural fall distance h2 between an upper pipe 4a1 and an electrolytic solution level 3a2 in a lower pipe 4a2. At such a liquid discontinuity formation portion, the electrolytic solution 3 has a very high electrical resistance, and liquid short-circuit between each two adjacent cells can be prevented.

The natural fall distance h required for obtaining such liquid discontinuity is different in accordance with the type, flow rate, temperature and the like of the electrolytic solution. Therefore, the natural fall distance must be set to satisfy such conditions.

An example of measurement of the natural fall distance h will be described below.

Figure 2:
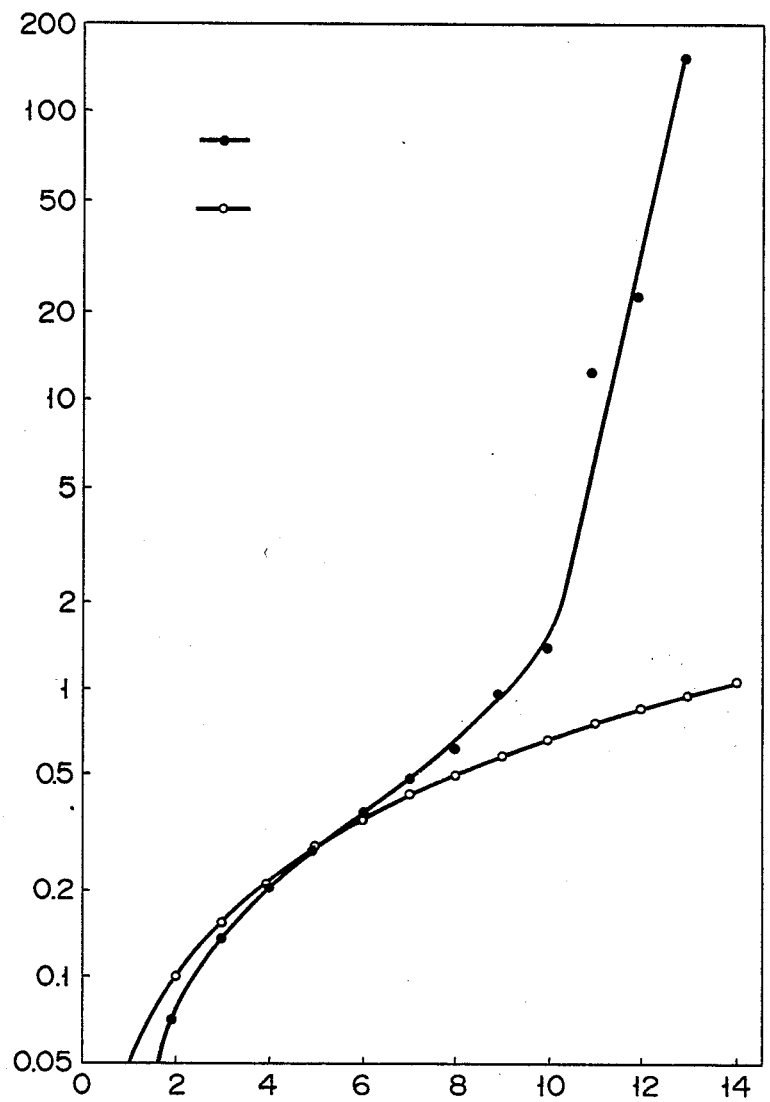
FIG. 2 is a graph showing the relationship between the liquid resistance and fall distance when the electrolytic solution is allowed to naturally fall.
Figure 3:
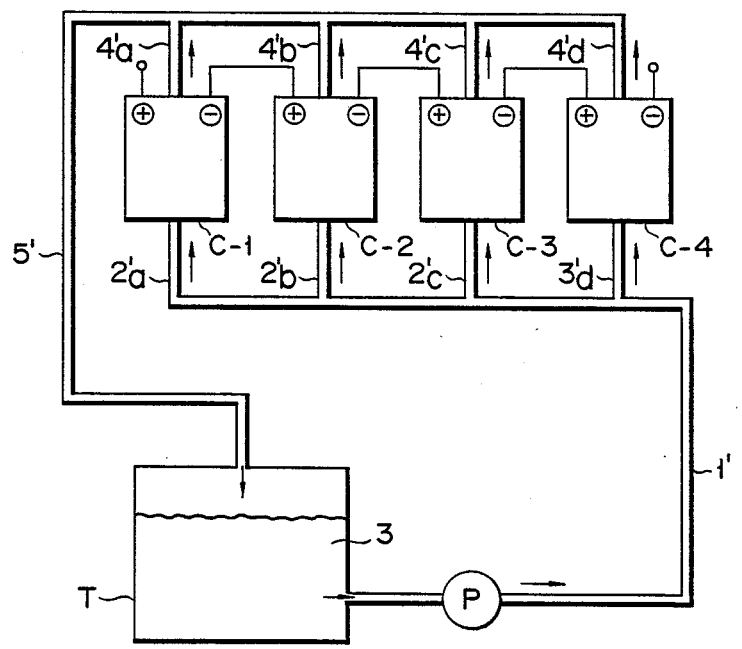
FIG. 3 is a diagram showing a conventional electrolytic solution supply type battery.
Figure 4:
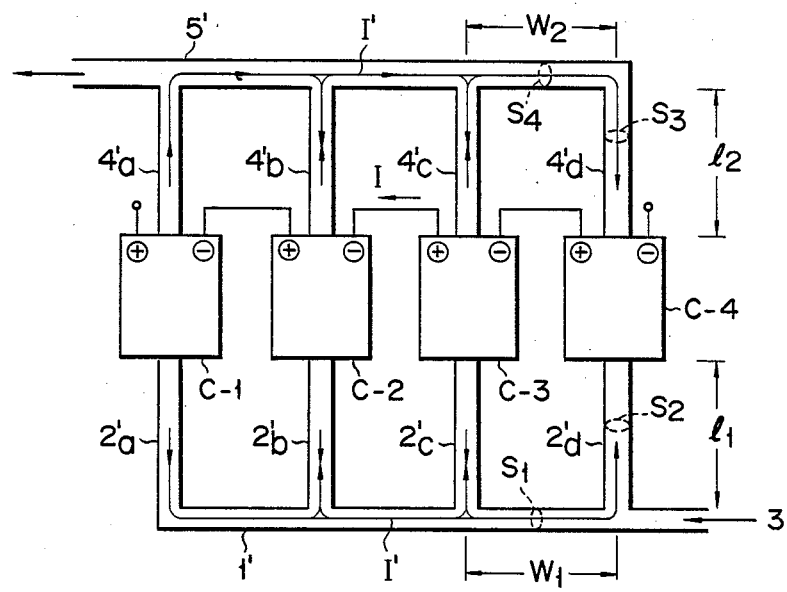
FIG. 4 is a diagram showing the liquid short-circuit state in the battery shown in FIG. 3.
Figure 5:
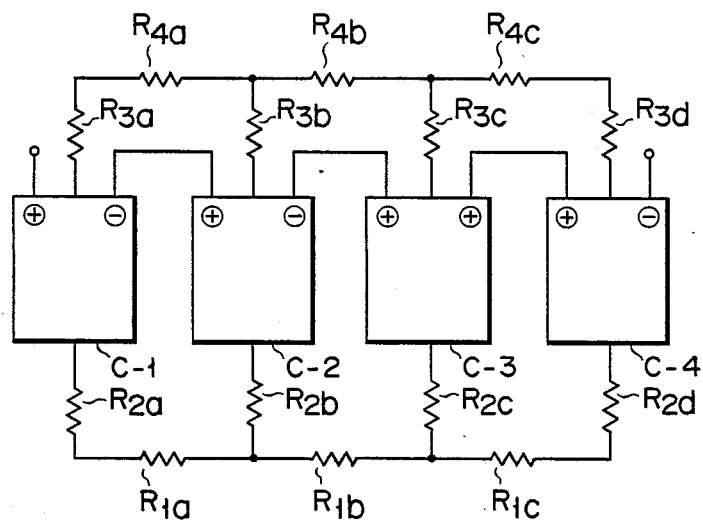
FIG. 5 is an electrical equivalent circuit of the liquid short-circuit state in FIG. 4.

Electrolytic solution composition; 2 mol/l zinc chloride+1 mol/l potassium chloride+2 mol/l sodium chloride aqueous solution
Solution temperature; 30° C.
Single cell solution flow rate; 600 ml/min
Natural fall speed; 36 cm/sec The electrolytic solution is allowed to fall naturally from a liquid fall port under the above conditions and a resistance R (kΩ) of the electrolytic solution at each fall distance is measured by the AC impedance measurement method. FIG. 2 is a graph showing the relationship between the resistance and the fall distance l (cm) from the liquid fall port. It is seen from the graph in FIG. 2 that the resistance R is approximately the same as the calculated value until the fall distance l reaches 6 cm but the resistance R deviates largely from the calculated value when the fall distance l exceeds 8 cm. Based upon this result, it is determined that the natural fall distance h required for obtaining liquid discontinuity falls within a range between 10 and 12 cm.

FIG. 1 shows a case wherein liquid flow interrupt portions are formed in both the distribution liquid paths at the electrolytic solution supply side and the exhaust liquid paths at the electrolytic solution exhaust side. However, even if such liquid flow interrupt portions are formed at either side due to a structural limit of the battery system, a considerable effect of preventing liquid short-circuit can be obtained.

When the electrolytic solution is allowed to fall from the liquid fall port at a liquid flow interrupt portion, in order to reduce the flow rate of the falling solution and to shorten the natural fall distance required for obtaining liquid discontinuity, two or more (normally two) liquid fall ports are formed. However, about 90% of the electrolytic solution is exhausted from one port and only a small amount of the solution is exhausted from the other port. As a result of this, the distance required for obtaining liquid discontinuity during natural fall still remains relatively long, so that the height of the battery is increased.

Figure 6:
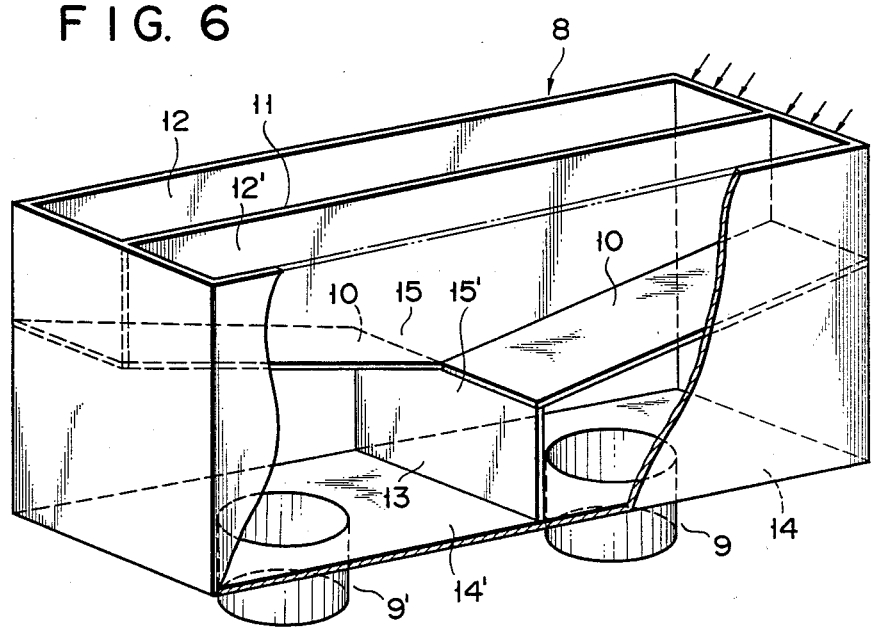
FIG. 6 is a partially cutaway perspective view of a liquid collection chamber of a battery of the present invention.

In order to resolve this problem, according to the embodiment of the present invention, a liquid collection chamber is arranged in each liquid flow interrupt portion, and the electrolytic solution is equally distributed and allowed to fall from the liquid fall ports in equal amounts With this arrangement, the natural fall distance required for obtaining liquid discontinuity can be shortened and the battery can be rendered compact. In order to equally distribute the electrolytic solution, the interior of the chamber is partitioned into upper and lower portions, and a partition parallel to the solution flow is arranged in the upper portion to equally divide the flow of the electrolytic solution into 2 to 4 portions and to provide 2 to 4 upper divided chambers Meanwhile, a partition is arranged in the lower portion to extend in a direction substantially perpendicular to the partition in the upper portion and to divide the interior of the lower portion into 2 to 4 lower divided chambers. Each of lower divided chambers is communicated with one upper divided chamber, and has a liquid fall port. More specifically, as shown in FIG. 6, a liquid collection chamber 8 is arranged at the liquid flow interrupt portion at each distribution or exhaust liquid path and is vertically divided by partitions 10. A partition 11 parallel to the flow of an electrolytic solution indicated by arrows in FIG. 6 is arranged in the upper portion of the chamber 8 to form upper divided chambers 12 and 12' which equally divide the flow width or flow amount of the electrolytic solution. A partition 13 is arranged in the lower portion of the chamber 8 in a direction substantially perpendicular to the flow of the electrolytic solution, i.e., perpendicular to the partition in the upper portion. The partition 13 forms lower divided chambers 14 and 14' equally dividing the interior of the lower portion and respectively having liquid fall ports 9 and 9'. The upper and lower divided chambers 12 and 12' and 14 and 14' are communicated with each other through communication ports 15 and 15', respectively. With this arrangement, the electrolytic solution flowing through the distribution liquid path or exhaust liquid path is equally divided, and is equally flowed down from the liquid fall ports 9 and 9' in the lower divided chambers 14 and 14'.

The above description has been made with reference to a case wherein the upper and lower portions of each collection chamber are respectively divided into two chambers. However, the present invention is not limited to this arrangement and each liquid collection chamber can be partitioned into upper and lower portions, and each upper or lower portion can be divided into 2 to 4 chambers, respectively.

EXAMPLE

The charge/discharge test was performed in zinc-chlorine batteries as samples of electrolytic solution supply type batteries according to the present invention wherein liquid flow interrupt portions were formed only at the exhaust liquid path and at both the distribution and exhaust liquid paths of each unit cell. The current efficiency, voltage efficiency, and energy efficiency of each battery were examined, and the effect of preventing liquid short-circuit was compared with a conventional battery having no liquid flow interrupt portion. In each unit cell, a zinc electrode plate (negative electrode) of dense graphite and a chlorine electrode plate (positive electrode) of porous graphite were opposed to each other in a polyvinyl chloride frame. Each unit cell had an effective electrode area of 300 cm$^2$. The test was performed for each arrangement of a single cell and series connections of 10 cells, 25 cells, and 40 cells. The operating conditions were as follows:

Electrolytic solution composition; 2 mol/l zinc chloride+1 mol/l potassium chloride+2 mol/l sodium chloride aqueous solution adjusted to pH 1
Electrolytic solution temperature; 30° C.
Electrolytic solution flow rate per unit cell; 600 ml/min
Charge/discharge current density; 30 mA/cm$^2$
Charge time; 3 hours The obtained results are shown below:

(1) When liquid flow interrupt portions were arranged at both the distribution and exhaust liquid paths:

TABLE 1

| | Current Efficiency (%) | | | |
| --- | --- | --- | --- | --- |
| | Single cell | 10 series cells | 25 series cells | 40 series cells |
| Conventional Battery | 85.6 | 85.1 | 82.3 | 80.2 |
| Battery of Present Invention | 85.5 | 85.5 | 85.2 | 85.1 |

TABLE 2

| | Voltage Efficiency (%) | | | |
| --- | --- | --- | --- | --- |
| | Single cell | 10 series cells | 25 series cells | 40 series cells |
| Conventional Battery | 84.3 | 84.1 | 83.9 | 83.7 |
| Battery of Present Invention | 84.4 | 84.2 | 84.3 | 84.3 |

TABLE 3

| | Energy Efficiency (%) | | | |
| --- | --- | --- | --- | --- |
| | Single cell | 10 series cells | 25 series cells | 40 series cells |
| Conventional Battery | 72.2 | 71.6 | 69.0 | 67.1 |
| Battery of Present Invention | 72.2 | 72.0 | 71.8 | 71.7 |

TABLE 4

| | Current Efficiency (%) | | | |
| --- | --- | --- | --- | --- |
| | Single cell | 10 series cells | 25 series cells | 40 series cells |
| Conventional Battery | 85.6 | 85.1 | 82.3 | 80.2 |
| Battery of Present Invention | 85.5 | 85.2 | 84.6 | 84.1 |

TABLE 5

| | Voltage Efficiency (%) | | | |
| --- | --- | --- | --- | --- |
| | Single cell | 10 series cells | 25 series cells | 40 series cells |
| Conventional Battery | 84.3 | 84.1 | 83.9 | 83.7 |
| Battery of Present Invention | 84.3 | 84.3 | 84.2 | 84.1 |

TABLE 6

| | Energy Efficiency (%) | | | |
| --- | --- | --- | --- | --- |
| | Single cell | 10 series cells | 25 series cells | 40 series cells |
| Conventional Battery | 72.2 | 71.6 | 69.0 | 67.1 |
| Battery of Present Invention | 72.2 | 71.8 | 71.2 | 70.7 |

It can be seen from the above results that, although the voltage efficiency only slightly decreases, the current efficiency significantly decreases and the energy efficiency also significantly decreases as the number of series-connected cells is increased in the conventional battery. In contrast to this, with the battery of the present invention, when the liquid flow interrupt portions are formed at both the distribution and exhaust liquid paths, although the current efficiency slightly decreases, such a decrease is much smaller than that with the conventional battery, and the decrease in energy efficiency is also small. When the liquid flow interrupt portion is formed only at the exhaust liquid path, the current and energy efficiencies are smaller than those in the case wherein the liquid flow interrupt portions are formed at both the distribution and exhaust liquid paths, but are considerably larger than those of the conventional battery. From the above, the prevention effect of liquid short-circuit in the battery of the present invention is apparent.

As described above, in an electrolytic solution supply type battery according to the present invention having liquid flow interrupt portions utilizing natural fall of an electrolytic solution, a considerable effect of preventing liquid short-circuit can be obtained. With this effect, current loss in battery can be significantly reduced, and the charge/discharge energy efficiency can be improved with a secondary battery while the discharge energy efficiency can be improved with a primary battery.

With a structure wherein a liquid collection chamber equally divides the electrolytic solution, the amount of electrolytic solution flowing down from each liquid fall port of the chamber can be kept the same. For this reason, due to the effect of preventing liquid short-circuit of the flowing electrolytic solution, the battery energy efficiency can be improved, the height of the chamber for preventing liquid short-circuit can be shortened, and the battery can be rendered compact, thus providing many industrial advantages.

What is claimed is:

1. An electrolytic solution supply type battery comprising:
   a plurality of unit cells which are electrically series-connected or stacked;

a plurality of distribution liquid path means for supplying an electrolytic solution to each of said plurality of unit cells from a common supply path;

a plurality of exhaust liquid path means for exhausting the electrolytic solution from each of said plurality of unit cells to a common exhaust path; and a liquid flow interrupt means formed at least at one of said distribution and exhaust liquid path means for obtaining discontinuity of the electrolytic solution by natural fall so as to prevent liquid short-circuit between each two adjacent unit cells of said plurality of unit cells;

each of said liquid flow interrupt means including upper and lower pipes for a corresponding one of said distribution or exhaust liquid path means, said upper and lower pipes being vertically separated from each other by a predetermined natural fall distance for obtaining said discontinuity of the electrolytic solution, and an upper end of said lower pipe having an enlarged diameter for receiving the falling electrolytic solution;

each of said liquid flow interrupt means having a liquid collection chamber at a lower end of said upper pipe, said liquid collection chamber comprising:

an upper portion and a lower portion;

a first partition means arranged in said upper portion to extend parallel to a flow of the electrolytic solution and to define a plurality of upper divided chambers for equally dividing a flow amount of the electrolytic solution into at least two substantially equal parts;

a second partition means arranged in said lower portion in a direction substantially perpendicular to said first partition means to define a plurality of lower divided chambers which equally divide an interior of said lower portion into the same number of parts into which the upper portion is divided by said first partition means, each of said lower divided chambers having a liquid fall port means for allowing the electrolytic solution to fall therethrough, and each of said upper divided chambers being in communication with a corresponding one of said lower divided chambers.

2. A battery according to claim 1, wherein said battery is a zinc-halogen battery of a bipolar type using as the electrolytic solution an aqueous solution containing a zinc halogenide as a major constituent.

3. A battery according to claim 1, wherein said liquid flow interrupt means is formed at each of said distribution and exhaust liquid paths.

* * * * *